(12) United States Patent
Cook

(10) Patent No.: US 8,157,283 B1
(45) Date of Patent: Apr. 17, 2012

(54) FIFTH WHEEL RELEASE TOOL APPARATUS

(76) Inventor: Curtis R. Cook, Norwalk, CA (US)

( * ) Notice: Subject to any disclaimer, the term of this patent is extended or adjusted under 35 U.S.C. 154(b) by 271 days.

(21) Appl. No.: 12/699,671

(22) Filed: Feb. 3, 2010

(51) Int. Cl.
*B65G 7/12* (2006.01)

(52) U.S. Cl. .............................. 280/433; 269/3; 294/26

(58) Field of Classification Search ................. 280/433; 269/3, 6, 95; 294/17, 24, 26, 82.11; 482/129, 482/130, 907
See application file for complete search history.

(56) References Cited

U.S. PATENT DOCUMENTS

| | | | | |
|---|---|---|---|---|
| 4,251,089 A | * | 2/1981 | Skaggs | 280/433 |
| 5,423,567 A | * | 6/1995 | Upton | 280/433 |
| 5,558,607 A | * | 9/1996 | Darling | 482/95 |
| 6,375,162 B1 | | 4/2002 | Johnson | |
| 6,935,664 B2 | * | 8/2005 | McGrew et al. | 294/26 |
| 6,951,332 B2 | * | 10/2005 | Zimmerman | 254/131 |
| 7,364,555 B1 | * | 4/2008 | Davidson | 601/33 |
| 2003/0127826 A1 | | 7/2003 | Clemence | |
| 2003/0201651 A1 | | 10/2003 | Lockhart | |

\* cited by examiner

*Primary Examiner* — Joanne Silbermann
*Assistant Examiner* — Michael Stabley

(57) ABSTRACT

The fifth wheel release tool apparatus has a cable having a cable first end spaced apart from a cable second end, a handle affixed to the cable first end. a pulley moveably disposed on the cable, the pulley entrapped on the cable, a first hook connected to the pulley, a second hook affixed to the cable second end, whereby the first hook is removably hooked to a release handle of a fifth wheel, the second hook removably hooked to any desired fixed object, allowing a user to pull the release handle by way of pulling the apparatus handle. The flexible cable allows a user to operate the apparatus from any angle or position and thereby further allows latch release in what may be crowded conditions.

5 Claims, 3 Drawing Sheets

FIFTH WHEEL RELEASE TOOL APPARATUS

BACKGROUND OF THE INVENTION

The difficulties often associated with the release of a fifth wheel kingpin from a fifth wheel of a tractor trailer engagement are well understood in the art. To that end, many devices have been proposed to assist in the task. Most such devices are lever bars and derivatives thereof. The present apparatus provides a unique and highly portable apparatus for releasing the kingpin of a fifth wheel.

FIELD OF THE INVENTION

The fifth wheel release tool apparatus relates to tools and more especially to a tool for releasing a latch for a fifth wheel kingpin.

SUMMARY OF THE INVENTION

The general purpose of the fifth wheel release tool apparatus, described subsequently in greater detail, is to provide a fifth wheel release tool apparatus which has many novel features that result in an improved fifth wheel release tool apparatus which is not anticipated, rendered obvious, suggested, or even implied by prior art, either alone or in combination thereof.

To attain this, the fifth wheel release tool apparatus provides for reducing the effort needed to release a trailer kingpin from a fifth wheel latch by one half. The apparatus provides for reduced space storage and portability by having a flexible cable and handle flexibly attached to the cable. The pulley is entrapped on the cable to prevent loss. One important feature of the apparatus is the second hook which allows the cable to be attached to any object and to any part of a tractor or trailer or other fixed object. A user is not constrained to a given position or attachment and can pull the handle in any way and from any position desired. The apparatus importantly thereby allows latch release in what are often crowded conditions.

Thus has been broadly outlined the more important features of the improved fifth wheel release tool apparatus so that the detailed description thereof that follows may be better understood and in order that the present contribution to the art may be better appreciated.

An object of the fifth wheel release tool apparatus is to ease the chore of releasing a fifth wheel kingpin and latch engagement.

Another object of the fifth wheel release tool apparatus is to reduce the effort involved in latch release by one half.

A further object of the fifth wheel release tool apparatus is to be compactly storable.

An added object of the fifth wheel release tool apparatus is to be highly portable.

And, an object of the fifth wheel release tool apparatus is to provide kingpin release reduced effort by allowing hook connection to a variety of locations on a tractor and trailer or other fixed object.

These together with additional objects, features and advantages of the improved fifth wheel release tool apparatus will be readily apparent to those of ordinary skill in the art upon reading the following detailed description of presently preferred, but nonetheless illustrative, embodiments of the improved fifth wheel release tool apparatus when taken in conjunction with the accompanying drawings.

In this respect, before explaining the current embodiments of the improved fifth wheel release tool apparatus in detail, it is to be understood that the fifth wheel release tool apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved fifth wheel release tool apparatus.

It is therefore important that the claims be regarded as including such equivalent constructions insofar as they do not depart from the spirit and scope of the fifth wheel release tool apparatus. It is also to be understood that the phraseology and terminology employed herein are for purposes of description and should not be regarded as limiting.

DETAILED DESCRIPTION OF THE DRAWINGS

Figure 1:
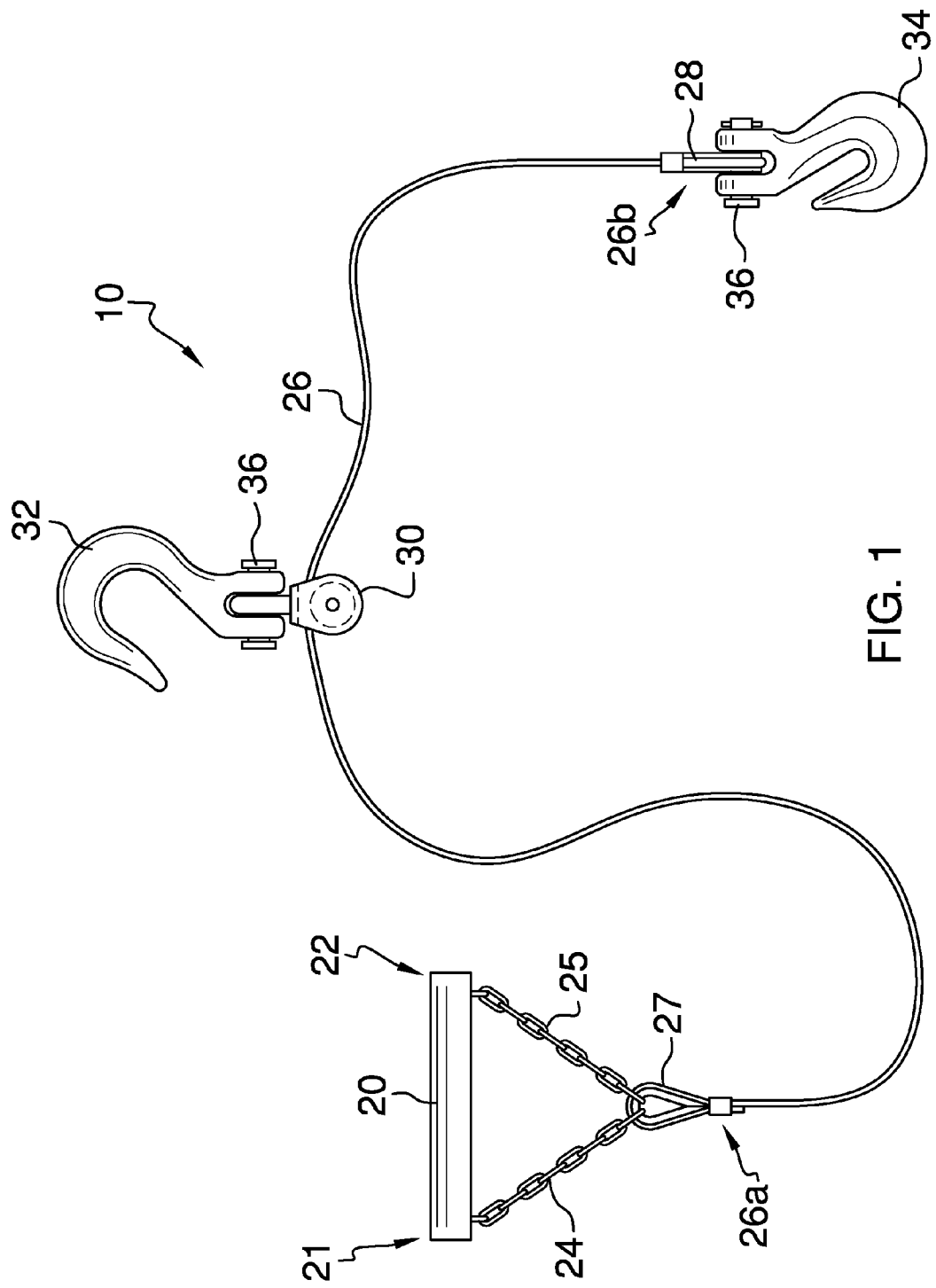
FIG. 1 is a top plan view of the apparatus.
Figure 2:
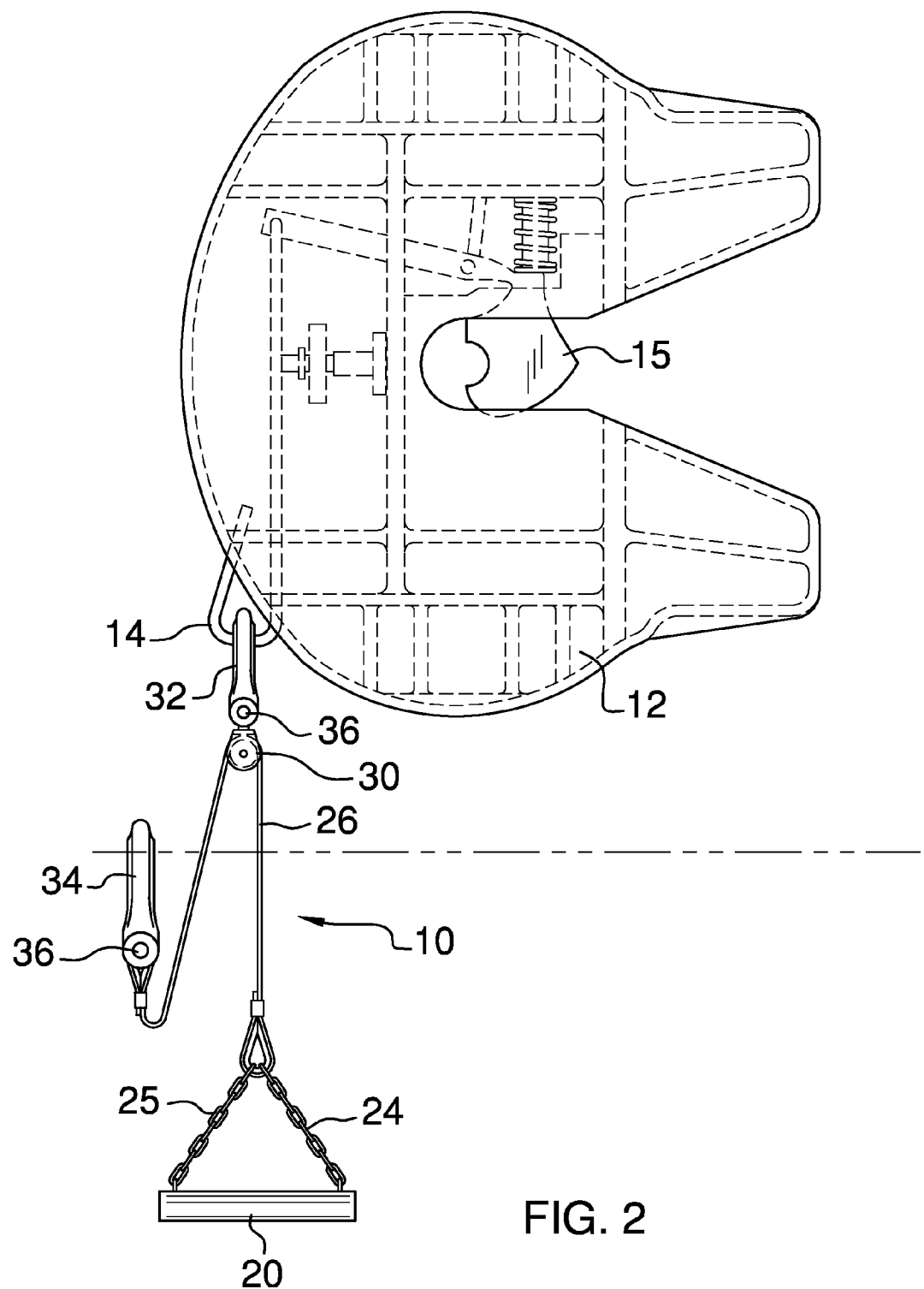
FIG. 2 is a top plan view of the apparatus removably hooked to a release handle of a fifth wheel.
Figure 3:
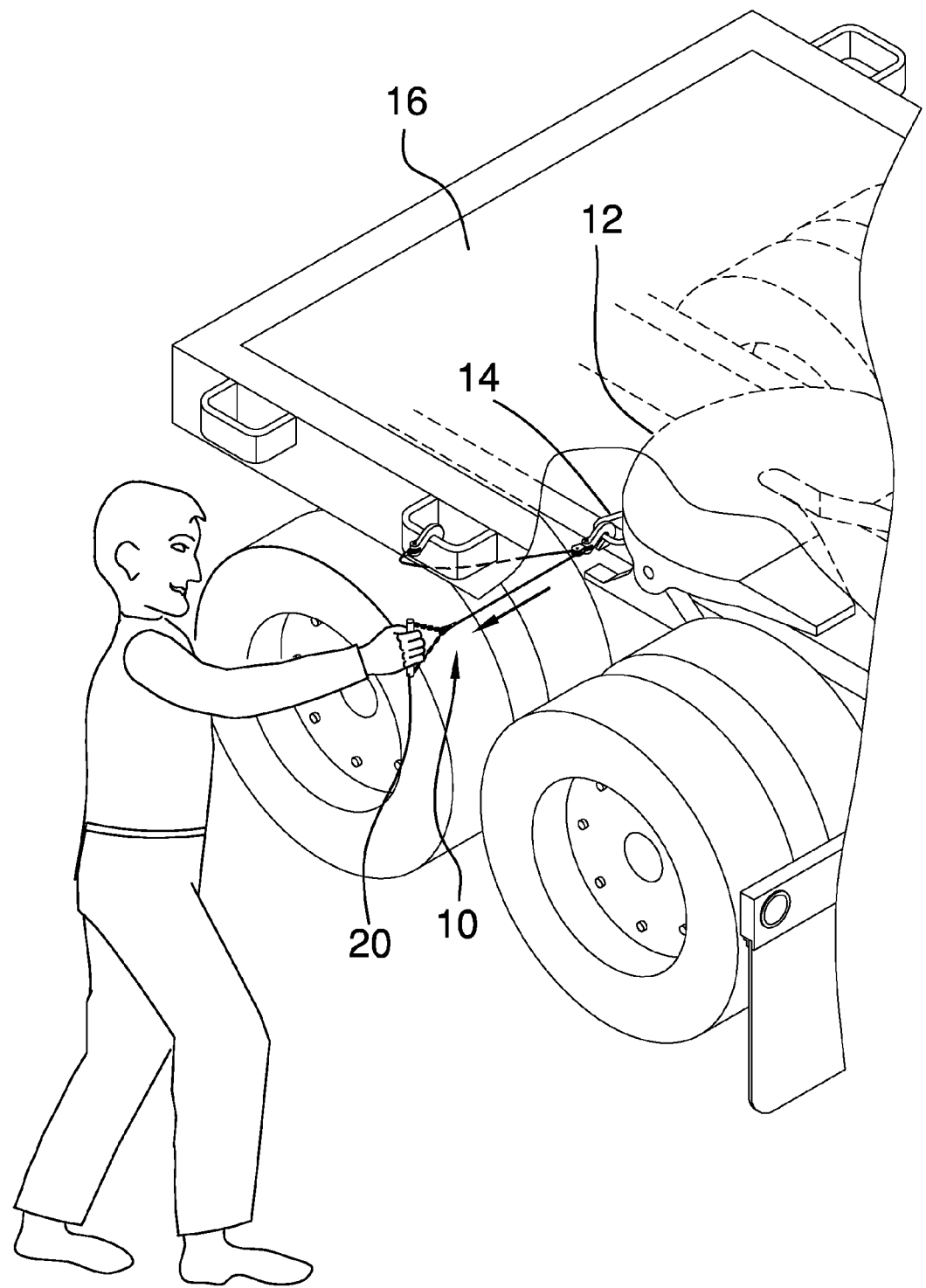
FIG. 3 is a perspective view of the apparatus in use.

With reference now to the drawings, and in particular FIGS. 1 through 3 thereof, the principles and concepts of the fifth wheel release tool apparatus generally designated by the reference number 10 will be described.

Referring to FIG. 1, the apparatus 10 partially comprises the cable 26 having a cable first end 26a spaced apart from the cable second end 26b. The first eyelet 27 is disposed on the cable first end 26a. The second eyelet 28 is disposed on the cable second end 26b. The pair of flexible links is affixed to the first eyelet 27. The links comprise the first link 24 and the second link 25.

The rigid handle 20 is affixed to the links. The handle 20 has a first end 21 spaced apart from the second end 22. The first end 21 is affixed to the first link 24. The second end 22 is affixed to the second link 25. The pulley 30 is moveably disposed on the cable 26. The first hook 32 is connected to the pulley 30 by a swivel 36. The pulley 30 is trapped on the cable 26. The second hook 34 is affixed to the second eyelet 28 by a swivel 36.

Referring to FIG. 2, the first hook 32 of the apparatus 10 is removably hooked on the release handle 14 of the fifth wheel 12.

Referring to FIG. 3 and again to FIG. 2, the first hook 32 is removably hooked to the release handle 14 of a fifth wheel 12. The second hook 34 is removably hooked to any desired fixed object on the tractor 16, allowing a user to pull the release handle 14 by way of pulling the apparatus 10 handle 20. The apparatus 10 reduces by half the force required to release the fifth wheel 12 latch 15.

With respect to the above description then, it is to be realized that the optimum dimensional relationships for the parts of the fifth wheel release tool apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the fifth wheel release tool apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the fifth wheel release tool apparatus may be used.

Therefore, the foregoing is considered as illustrative only of the principles of the fifth wheel release tool apparatus. Further, since numerous modifications and changes will readily occur to those skilled in the art, it is not desired to limit the fifth wheel release tool apparatus to the exact construction and operation shown and described, and accordingly, all suitable modifications and equivalents may be resorted to, falling within the scope of the fifth wheel release tool apparatus.

What is claimed is:

1. A fifth wheel release tool apparatus comprising, in combination;
   - a cable having a cable first end spaced apart from a cable second end;
   - a handle affixed to the cable first end;
   - a pulley moveably disposed on the cable, the pulley entrapped on the cable;
   - a first hook connected to the pulley;
   - a second hook affixed to the cable second end;
   - whereby the first hook is removably hooked to a release handle of a fifth wheel, the second hook removably hooked to any desired fixed object, allowing a user to pull the release handle by way of pulling the apparatus handle.

2. The apparatus according to claim 1 further comprising a rigid handle, the rigid handle having a first end spaced apart from a second end.

3. The apparatus according to claim 1 further comprising a pair of flexible links attaching the handle to the cable first end, the links comprising a first link affixed to the handle first end, a second link affixed to the handle second end.

4. The apparatus according to claim 2 further comprising a pair of flexible links attaching the handle to the cable first end, the links comprising a first link affixed to the handle first end, a second link affixed to the handle second end.

5. A fifth wheel release tool apparatus comprising, in combination;
   - a flexible cable having a cable first end spaced apart from a cable second end;
   - a first eyelet disposed on the cable first end;
   - a second eyelet disposed on the cable second end;
   - a pair of flexible links affixed to the first eyelet, the links comprising a first link and a second link;
   - a rigid handle affixed to the links, the handle having a first end spaced apart from a second end, the first end affixed to the first link, the second end affixed to the second link;
   - a pulley moveably disposed on the cable, the pulley entrapped on the cable;
   - a first hook connected to the pulley by a swivel;
   - a second hook affixed to the second eyelet by a swivel;
   - whereby the first hook is removably hooked to a release handle of a fifth wheel, the second hook removably hooked to any desired fixed object, allowing a user to pull the release handle by way of pulling the apparatus handle.

* * * * *